(12) United States Patent
Chen et al.

(10) Patent No.: US 8,837,422 B2
(45) Date of Patent: Sep. 16, 2014

(54) LOW-COST LTE SYSTEM WITH DISTRIBUTED CARRIER AGGREGATION ON THE UNLICENSED BAND

(75) Inventors: Tao Chen, Espoo (FI); Gilles Charbit, Farnborough (GB)

(73) Assignee: Broadcom Corporation, Irvine, CA (US)

( * ) Notice: Subject to any disclaimer, the term of this patent is extended or adjusted under 35 U.S.C. 154(b) by 231 days.

(21) Appl. No.: 13/365,432

(22) Filed: Feb. 3, 2012

(65) Prior Publication Data
US 2013/0195073 A1 Aug. 1, 2013

(30) Foreign Application Priority Data

Jan. 30, 2012 (GB) .................................. 1201548.3

(51) Int. Cl.
*H04W 4/00* (2009.01)
*H04H 20/67* (2008.01)
(52) U.S. Cl.
USPC .......................................... 370/330; 370/339
(58) Field of Classification Search
None
See application file for complete search history.

(56) References Cited

U.S. PATENT DOCUMENTS

| 7,595,766 | B2 * | 9/2009 | Rofougaran | 343/795 |
|---|---|---|---|---|
| 8,073,515 | B2 * | 12/2011 | Rofougaran | 455/575.7 |
| 8,190,102 | B2 * | 5/2012 | Rofougaran | 455/77 |
| 2010/0182950 | A1 * | 7/2010 | Sexton et al. | 370/328 |
| 2012/0034917 | A1 * | 2/2012 | Kazmi | 455/434 |
| 2013/0044621 | A1 * | 2/2013 | Jung et al. | 370/252 |
| 2013/0065600 | A1 * | 3/2013 | Lim | 455/450 |
| 2013/0107868 | A1 * | 5/2013 | Sadek et al. | 370/338 |
| 2013/0143502 | A1 * | 6/2013 | Kazmi et al. | 455/62 |
| 2013/0188552 | A1 * | 7/2013 | Kazmi et al. | 370/315 |

FOREIGN PATENT DOCUMENTS

| EP | 2341678 A1 | 5/2011 |
|---|---|---|
| EP | 2386182 A1 | 8/2011 |
| EP | 2453598 A2 | 3/2012 |
| EP | 2323304 A2 | 5/2012 |
| GB | 2477649 A | 7/2011 |
| WO | WO-2009/125056 A1 | 10/2009 |
| WO | WO-2012/038912 A1 | 11/2011 |

OTHER PUBLICATIONS

GB Search Report under Section 17 for corresponding GB patent Application No. 1201548.3 mailed on May 22, 2012.
"Discussions on Carrier Aggregation across LTE and WiFi", Intel Corporation, 3GPP TSG-RAN meeting #53, RP111094, Sep. 2011, 4 pgs.

(Continued)

*Primary Examiner* — Eunsook Choi
(74) *Attorney, Agent, or Firm* — Stanton IP Law (57) ABSTRACT

A method for distributed carrier aggregation on unlicensed bands is described. The method includes tuning an antenna of a user equipment to a first carrier. The method includes transmitting, from an access point on a first carrier, information regarding a second carrier. The method also includes receiving, on the first carrier via the antenna, the information regarding the second carrier. The first carrier and the second carrier are in an unlicensed band. The method includes retuning the antenna to the second carrier and communicating data on the second carrier via the antenna. A maximum transmission power for the second carrier is based at least in part on a bandwidth of the second carrier. Apparatus and computer readable media are also described.

20 Claims, 6 Drawing Sheets

(56) References Cited

OTHER PUBLICATIONS

"New Study Item Proposal for Radio Level Dynamic Flow Switching between 3GPP-LTE and WLAN", Intel Corporation, 3GPP TSG RAN #53, RP-111104, Sep. 2011, 5 pgs.

"Proposed SID: Provision of low-cost MTC UEs based on LTE", Vodafone, TSG RAN meeting #53, RP 111112, Sep. 2011, 6 pgs.

"Electromagnetic compatibility and Radio spectrum Matters (ERM); Wideband transmission systems; Data transmission equipment operating in the 2,4 GHz ISM band and using wide band modulation techniques; Harmonized EN covering the essential requirements of article 3.2 of the R&TTE Directive", ETSI EN 300 328 V1.8.0, Jul. 2011, 84 pgs.

"ERC Recommendation 70-03 Relating to the Use of Short Range Devices (SRD)", Frequency Management, Regulatory Affairs and Spectrum Engineering Working Groups, Aug. 2011, 60 pgs.

\* cited by examiner

LOW-COST LTE SYSTEM WITH DISTRIBUTED CARRIER AGGREGATION ON THE UNLICENSED BAND

TECHNICAL FIELD

The exemplary and non-limiting embodiments of this invention relate generally to wireless communication systems, methods, devices and computer programs and, more specifically, relate to providing distributed carrier aggregation on unlicensed bands.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
AP access point
BW bandwidth
CA carrier aggregation
CC component carrier
CCA clear channel assessment
CE control element
DL downlink (eNB towards UE)
DS direct sequence
eNB E-UTRAN Node B (evolved Node B)
E-UTRAN evolved UTRAN (LTE)
FH frequency hopping
ISM industrial scientific medical
LTE long term evolution of UTRAN (E-UTRAN)
LTE-A long term evolution advanced
MAC medium access control
MTC machine type communication
Node B base station
OFDM orthogonal frequency division multiplexing
PCC primary cell carrier
PCFICH physical control format indicator channel
PDCCH physical downlink control channel
PHICH physical hybrid indicator channel
PHY physical
PRB physical resource block
PUCCH physical uplink control channel
RRC radio resource control
SCC secondary cell carrier
UE user equipment, such as a mobile station or mobile terminal
UL uplink (UE towards eNB)

As is specified in 3GPP documents, LTE-A should operate in spectrum allocations of different sizes, including wider spectrum allocations than those of prior LTE releases (e.g., up to 100 MHz) to achieve the peak data rate of 100 Mbit/s for high mobility and 1 Gbit/s for low mobility. Carrier aggregation, where two or more component carriers (CCs) are aggregated, may be used in order to support transmission bandwidths larger than 20 MHz. The carrier aggregation could be contiguous or non-contiguous. This technique, as a bandwidth extension, can provide significant gains in terms of peak data rate and cell throughput as compared to non-aggregated operation.

A terminal may simultaneously receive one or multiple component carriers depending on its capabilities. A LTE-A terminal with reception capability beyond 20 MHz can simultaneously receive transmissions on multiple component carriers. A legacy terminal might receive transmissions on a single component carrier only, provided that the structure of the component carrier follows the relevant specifications. Moreover, it is required that LTE-A should be backwards compatible with older standards in the sense that a legacy terminal should be operable in the LTE-A system, and that a LTE-A terminal should be operable in a Rel-8 LTE system.

Figure 1:
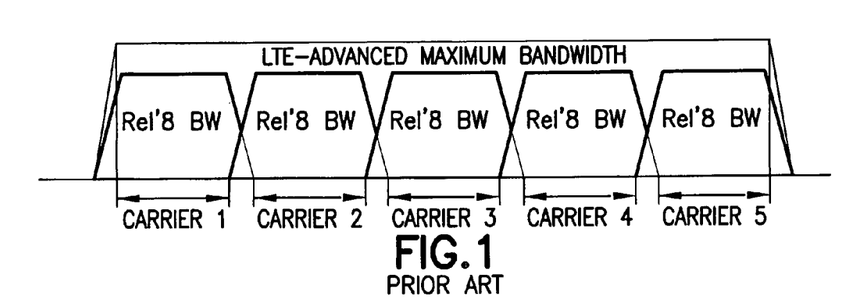
FIG. 1 shows an example of carrier aggregation as proposed for the LTE-A system.

FIG. 1 shows an example of the carrier aggregation, where M 20 MHz component carriers are combined together to form M×20 MHz BW (e.g., 5×20 MHz=100 MHz given M=5). Legacy terminals may receive/transmit on one component carrier, whereas LTE-A terminals may receive/transmit on multiple component carriers simultaneously to achieve higher (wider) bandwidths.

With further regard to carrier aggregation, what is implied is that one access point (e.g., an eNB) can effectively contain more than one cell on more than one CC (frequency carrier), and the eNB can utilize one (as in E-UTRAN Rel-8) or more cells (in an aggregated manner) when assigning resources and scheduling the UE.

Carrier aggregation (CA) in LTE-Advanced extends the maximum bandwidth in the uplink (UL) or downlink (DL) directions by aggregating multiple carriers within a frequency band (intra-band CA) or across frequency bands (inter-band CA).

A primary cell carrier (PCC) using LTE technology may be configured on a licensed band for primary access in order to provide mobility, security and state management for user terminals while a secondary cell carrier (SCC) (e.g., using WLAN technology) is opportunistically configured/activated on an un-licensed band for secondary access. The SCC may be used to provide additional data plane transport.

As many machine type communication (MTC) devices are targeting for low-end applications (e.g., low cost, low data rate, etc.) which can be handled adequately by GSM/GPRS. However, MTC device vendors and operators may wish to consider migrating low-end MTC devices from GSM/GPRS to LTE networks. This move may provide benefits for reducing radio frequency (RF) component cost in the devices, for example, simplification and reduction in support of bands/radio access technologies (RAT)/RF chains/antenna ports, transmission power, lower maximum channel bandwidths for various frequency bands, and support of half-duplex FDD mode. Additionally, benefits may be gained due to baseband-RF conversion aspects, significantly lower peak data rate support, less required support of spatial processing mode in uplink/downlink and reduced radio protocol processing.

Frame based requirements in "Listen Before Talk" applications which may be based on "Detect and Avoid" strategies may not apply to a transmission equipment if it limits its max output power (e.g., to 10 dBm instead of the 20 dBm/23 dBm max output power, such as specified in the ISM 2.4 GHz/5 GHz unlicensed bands). Thus, before transmission, the equipment might not need to perform a clear channel assessment (CCA) in order to check using energy detection; observe the operating channel for the duration of the CCA observation time (e.g., 20 µs min); consider a channel to be occupied if the energy level in the channel exceeds the energy detection threshold or, if the channel is clear, begin transmitting immediately. This significantly facilitates the deployment of LTE on un-licensed band as the LTE transmitter may transmits without a need for sensing of WiFi transmissions provided it limits its transmission power to 10 dBm.

A standalone LTE system operating in an un-licensed band may use some intra-band carrier aggregation mechanisms to increase robustness against interference from WiFi systems (and from other cellular networks). In carrier aggregation mechanisms, the PCC may be mapped to a carrier, C1, in the un-licensed band, and the SCC may be mapped to another carrier, C2, in the un-licensed band. However, carrier aggregation typically involves more complex RF chain design and more complex baseband-RF conversion aspects. Low-cost MTC devices supported by a standalone LTE system may only have one single Rx chain and baseband processing capability only sufficient to process one carrier at a time which prevents conventional CA techniques where monitoring bother C1 and C2 may be required.

There are up to 3 non-overlapping WiFi channels possible on the ISM 2.4 GHz band if the DS PHY signal is spread over 22 MHz (as in IEEE 802.11b standards); or up to 8 (non-overlapping) channels on the ISM 5 GHz band if using OFDM PHY signals (effectively occupying 16.25 MHz per OFDM signal as in IEEE 802.11a standards). At least two relatively interference-free carriers may be needed for carrier aggregation, which may be difficult to find on the ISM band.

Traditional CA-based solutions for standalone LTE system over the un-licensed band have at least two carriers for the carrier aggregation with some sensing-based protocols (e.g., ON-OFF patterns, CCA), fast CC configuration activation, and broken-CC repair mechanisms. These ways assume the PCC and SCC are active and hence require the UE RF front end and baseband processing to support two carriers at the same time in normal operations. Accordingly, these techniques are not applicable for low-cost MTC devices equipped with a single Rx chain.

There is need for a CA solution that can be both (i) supported by low-cost MTC devices equipped with a single receiver (Rx) chain and limited baseband processing capability, and (ii) deployed in unlicensed band where there may be scarcity of available interference-free carriers.

SUMMARY

The below summary section is intended to be merely exemplary and non-limiting.

The foregoing and other problems are overcome, and other advantages are realized, by the use of the exemplary embodiments of this invention.

An exemplary embodiment of this invention provides a method for distributed carrier aggregation on unlicensed bands. The method includes tuning an antenna of a user equipment to a first carrier. The method also includes receiving, on the first carrier via the antenna, information regarding a second carrier. The first carrier and the second carrier are in an unlicensed band. The method includes retuning the antenna to the second carrier and communicating data on the second carrier via the antenna. A maximum transmission power for the second carrier is based at least in part on a bandwidth of the second carrier.

A further exemplary embodiment of this invention provides a method for distributed carrier aggregation on unlicensed bands. The method includes transmitting, from an access point on a first carrier, information regarding a second carrier. The first carrier and the second carrier are in an unlicensed band. The method also includes communicating data with a user equipment on the second carrier. The maximum transmission power for the second carrier is based at least in part on a bandwidth of the second carrier.

Another exemplary embodiment of this invention provides an apparatus for distributed carrier aggregation on unlicensed bands. The apparatus includes at least one processor and at least one memory including computer program code. The at least one memory and the computer program code are configured to, with the at least one processor, cause the apparatus at least to perform actions. The actions include to tune an antenna of a user equipment to a first carrier. The actions also include to receive, on the first carrier via the antenna, information regarding a second carrier. The first carrier and the second carrier are in an unlicensed band. The actions include to retune the antenna to the second carrier and to communicate data on the first carrier via the antenna. A maximum transmission power for the second carrier is based at least in part on a bandwidth of the second carrier.

A further exemplary embodiment of this invention provides an apparatus for distributed carrier aggregation on unlicensed bands. The apparatus includes at least one processor and at least one memory including computer program code. The at least one memory and the computer program code are configured to, with the at least one processor, cause the apparatus at least to perform actions. The actions include to transmit, from an access point on a first carrier, information regarding a second carrier. The first carrier and the second carrier are in an unlicensed band. The actions also include to communicate data with a user equipment on the first carrier. The maximum transmission power for the second carrier is based at least in part on a bandwidth of the second carrier.

Another exemplary embodiment of this invention provides a computer readable medium comprising a set of instructions for distributed carrier aggregation on unlicensed bands. The set of instructions, when executed on a data processor, causes the data processor to perform steps. The steps include tuning an antenna of a user equipment to a first carrier. The steps also include receiving, on the first carrier via the antenna, information regarding a second carrier. The first carrier and the second carrier are in an unlicensed band. The step include retuning the antenna to the second carrier and communicating data on the second carrier via the antenna. A maximum transmission power for the second carrier is based at least in part on a bandwidth of the second carrier.

A further exemplary embodiment of this invention provides a computer readable medium comprising a set of instructions for distributed carrier aggregation on unlicensed bands. The set of instructions, when executed on a data processor, causes the data processor to perform steps. The steps include transmitting, from an access point on a first carrier, information regarding a second carrier. The first carrier and the second carrier are in an unlicensed band. The steps also include communicating data with a user equipment on the second carrier. The maximum transmission power for the second carrier is based at least in part on a bandwidth of the second carrier.

Another exemplary embodiment of this invention provides an apparatus for use in a user equipment for distributed carrier aggregation on unlicensed bands. The apparatus includes means for tuning an antenna of a user equipment to a first carrier. The apparatus also includes means for receiving, on the first carrier via the antenna, information regarding a second carrier. The first carrier and the second carrier are in an unlicensed band. The apparatus includes means for retuning the antenna to the second carrier and means for communicating data on the second carrier via the antenna. A maximum transmission power for the second carrier is based at least in part on a bandwidth of the second carrier.

A further exemplary embodiment of this invention provides an apparatus for use in a user equipment for distributed carrier aggregation on unlicensed bands. The apparatus includes means for transmitting, from an access point on a first carrier, information regarding a second carrier. The first carrier and the second carrier are in an unlicensed band. The apparatus also includes means for communicating data with a user equipment on the second carrier. The maximum transmission power for the second carrier is based at least in part on a bandwidth of the second carrier.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Various exemplary embodiments in accordance with this invention provide a distributed LTE CA system consisting of a core carrier and data carrier(s) in the un-licensed band, where only one carrier is active at a time. Thus, devices that are limited to receiving on one band at a time may use the CA system by re-tuning to the active carrier. The eNB may limit its maximum transmission power to 10 dBm. Sensing of WiFi interference may be used to limit impact of interfering WiFi system on the LTE system and no clear channel assessment (CCA) and Listen Before Talk is required by the eNB or LTE UEs on the un-licensed band. In some non-limiting embodiments, the entire system can operating in the un-licensed band (e.g., both core carrier and data carrier are provided in the un-licensed band) and/or may use some intra-band carrier aggregation mechanisms.

Figure 2:
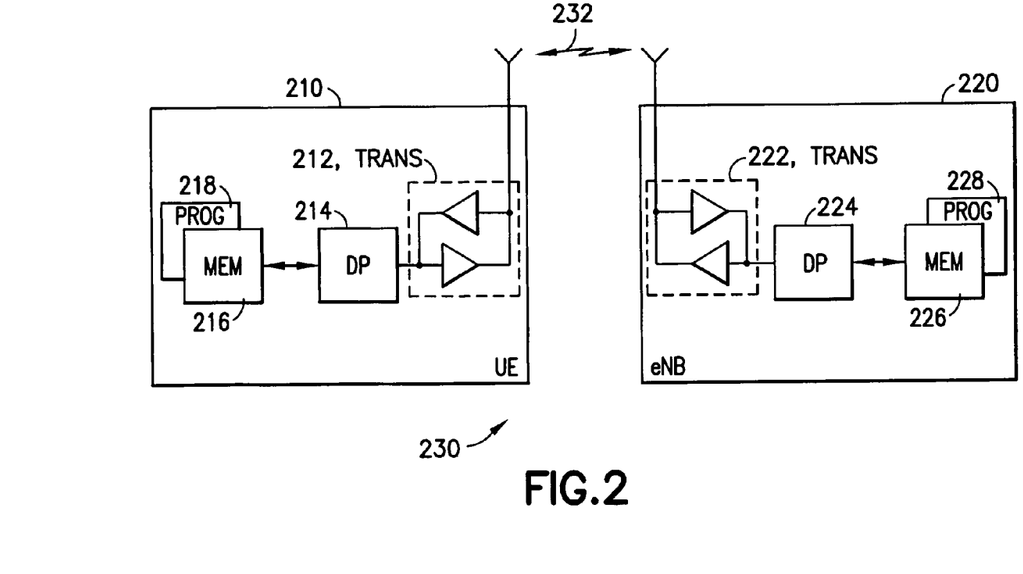
FIG. 2 shows a simplified block diagram of exemplary electronic devices that are suitable for use in practicing various exemplary embodiments of this invention.

Before describing in further detail various exemplary embodiments of this invention, reference is made to FIG. 2 for illustrating a simplified block diagram of various electronic devices and apparatus that are suitable for use in practicing exemplary embodiments of this invention.

In the wireless system 230 of FIG. 2, a wireless network is adapted for communication over a wireless link 232 with an apparatus, such as a mobile communication device which may be referred to as a UE 210, via a network access node, such as a Node B (base station), and more specifically an eNB 220.

The UE 210 includes a controller, such as a computer or a data processor (DP) 214, a computer-readable memory medium embodied as a memory (MEM) 216 that stores a program of computer instructions (PROG) 218, and a suitable wireless interface, such as radio frequency (RF) transceiver 212, for bidirectional wireless communications with the eNB 220 via one or more antennas.

The eNB 220 also includes a controller, such as a computer or a data processor (DP) 224, a computer-readable memory medium embodied as a memory (MEM) 226 that stores a program of computer instructions (PROG) 228, and a suitable wireless interface, such as RF transceiver 222, for communication with the UE 210 via one or more antennas.

At least one of the PROGs 218 and 228 is assumed to include program instructions that, when executed by the associated DP, enable the device to operate in accordance with exemplary embodiments of this invention, as will be discussed below in greater detail.

That is, various exemplary embodiments of this invention may be implemented at least in part by computer software executable by the DP 214 of the UE 210; and/or by the DP 224 of the eNB 220, or by hardware, or by a combination of software and hardware (and firmware). The UE 210 and the eNB 220 may also include dedicated processors.

In general, the various embodiments of the UE 210 can include, but are not limited to, cellular telephones, tablets having wireless communication capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 216 and 226 may be of any type suitable to the local technical environment and may be implemented using any suitable data storage technology, such as semiconductor based memory devices, flash memory, magnetic memory devices and systems, optical memory devices and systems, fixed memory and removable memory. The DPs 214 and 224 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 212 and 222) may be of any type suitable to the local technical environment and may be implemented using any suitable communication technology such as individual transmitters, receivers, transceivers or a combination of such components.

The core carrier is configured by the eNB for all the UEs in the cell. The core carrier is used to carry the essential signaling (e.g., RRC signaling). The data carrier is configured by the eNB for an individual UE (or a group of UEs) and is used for data capacity. The eNB can also page the UE on the core carrier.

Generally, there is only one core carrier. The core carrier can be selected from the existing data carrier(s). In this case, the selected data carrier can be promoted to be the core carrier. The old core carrier would be either downgraded as the data carrier or be released, for example, in cases where the core carrier begins to suffer from poor SNR conditions (e.g., due to high WiFi interference, etc.). The configuration of the new core carrier is indicated (e.g., in a SIB message) on the old core carrier before being downgraded/released.

There may be more than one data carrier. The each data carrier may be configured with a data-carrier specific system bandwidth (BW). Thus, each data carrier can have a different BW. This allows the max eNB output power (e.g., of 10 dBm) to be used over a relatively smaller bandwidth if it is needed to improve the SINR at the UEs on a given data carrier experiencing significant WiFi interference, e.g. a single data carriers may be configured with a system bandwidth of 10 MHz (50 PRBs) while other data carriers are configured with a BW of 20 MHz (100 PRBs). This gives a 3 dB SINR gain. Using a 1.4 MHz (6 PRBs) system bandwidth instead of 20 MHz, the gain can be about $10*\log(100/6)=12$ dB.

In principle, the carriers are non-adjacent, i.e., only one carrier can be received using only 1 Rx Chain. Thus, each user having 1 Rx Chain (e.g., using an MTC device) would only receive the control/data information on only one core/data carrier with one receiver. Switching or frequency hopping (FH) between the core and data carriers via RF retuning allows the device to receive both core and data carriers (at different times). The user can be redirected to the other data carriers via signaling in the core carrier or signaling in the current data carrier.

Figure 3:
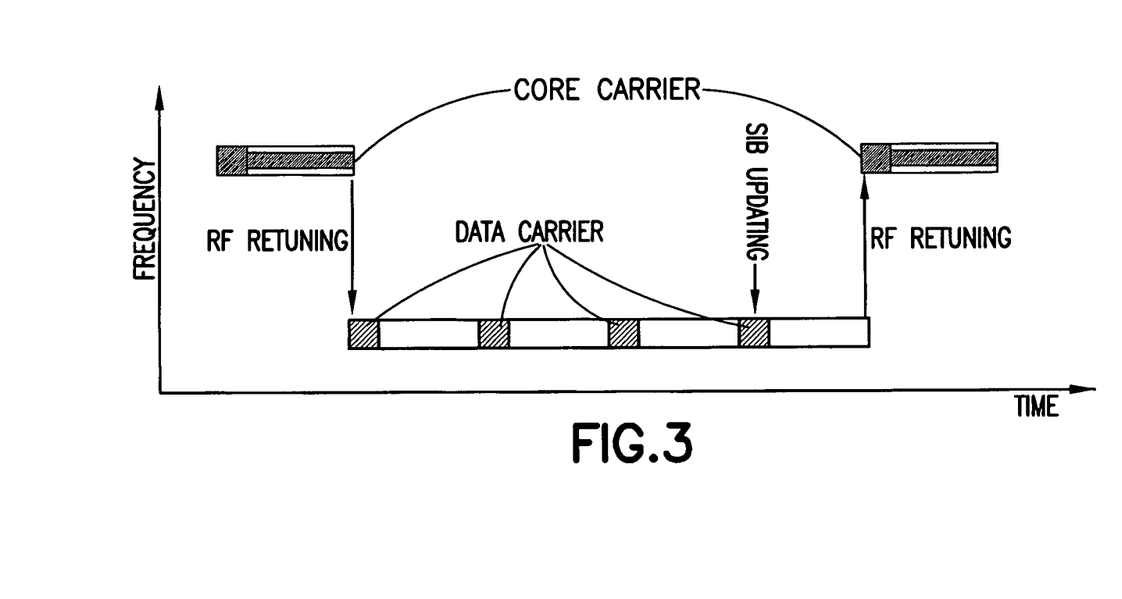
FIG. 3 illustrates a core carrier and data carrier in accordance with an exemplary embodiment of this invention.

FIG. 3 illustrates a core carrier and data carrier in accordance with an exemplary embodiment of this invention. Each user first locks to the core carrier to get system information necessary for the core carrier configuration (e.g., MIB, SIB1, SIB2, etc.). The data carrier configuration and core carrier/data carrier scheduling is indicated via the signaling in the core carrier. The MTC device may retune from the core carrier in order to receive data carrier on a different frequency. Likewise, the MTC device retunes from the data carrier to the core carrier in order to receive the core carrier at the appropriate time. Furthermore, a SIB updating message in the data carrier may be used to signal the MTC device when to retune. Alternatively, the MTC device may automatically retune to the core carrier after a predetermined time.

To allow checking of essential RRC signaling (e.g., paging, dedicated signaling, and buffer status report, etc.), the eNB may configure a RF switching schedule from core carrier to data carrier or from data carrier to core carrier. This may be done with some RF switching periodicity according to $T_{RF\ switching}=[T_{core\_carrier}, T_{data\_carrier}]$. Alternatively, this may be performed according to some RF switching bitmap, e.g., where a "0" value indicates the core carrier is configured for given radio frames or subframes; and a "1" value indicates the data carrier is configured for given radio frames or subframes. The eNB may transmit on the core carrier at any time in order to provide details to other MTC device which may have a different RF switching schedule. Accordingly, the eNB may configure the core carrier transmissions for a specific time to address MTC devices that are scheduled to receive the core carrier at that time.

In the core carrier, a new SIB message may be broadcast that includes new information about the data carriers, e.g., a data carrier frequency indicator (DCFI), the frequency bandwidth and the central frequency information. The UE listens to the new SIB message in the core carrier in order to measure suitable data carriers. Based on the measurement report or cell update message from the UE, the eNB can assign the UE to monitor one selected data carrier via dedicated signaling in the core carrier or via a MAC control element (CE). The corresponding UE switches to monitor the indicated data carrier via RF retuning and switches back to the core carrier to receive essential RRC signaling based on the RF switching schedule (e.g., a RF switching periodicity or an RF switching bitmap) configured via dedicated signaling.

An RRC Connected UE on the configured data carrier monitors the PDCCH in the user-specific search space to receive the data and MAC CE including the new SIB updating indicator. The UE may also monitor the PDCCH in the common search space to receive the new SIB updating indicator via dedicated signaling. In case the SIB updating indicator is set to "true", the UE would switch to core carrier for receiving the updated SIB message via RF retuning.

An RRC Idle UE within the location tracking area camps on the configured core carrier to monitor the PDCCH in the common search space in order to receive the paging information that may include a new SIB updating indicator. In case the SIB updating factor is set to "true", the UE detects the updated SIB message on the new SIB. No RF retuning is needed since UE is already camping on the core carrier.

The eNB may configure different data carriers separately. Then the eNB may assign UEs to the data carriers based on the data carrier load, QoS, and user priority. For example, a US with a high priority may be assigned Mobility is based on measurements in both the core carrier and the data carrier. In mobility procedure between two cells operating distributed CA system, if the quality of both the core carrier and at least one data carrier in a targeting cell is better than the serving cell, the UE would switch to the new cell. In case the core carrier is broken and no data carrier in the serving cell can be promoted to be the new core carrier, the UE may switch to any available new cell.

The Core carrier is configured to carry essential signaling. This signaling may include new SIB messages to indicate the data carrier configuration such as the bandwidth and the central frequency, data carrier indicators to allocate the data carrier for UE monitoring, PBCH/Release-8 SIB/Paging, PSS/SSS, PDCCH/PHICH/PCFICH, CRS, operating bandwidth, etc.

Using a narrow bandwidth (for example, with a minimum requirement of 1.08 Mhz), the core carrier could be deployed in the licensed band in between two adjacent UTRAN carriers or in the unlicensed band in between two in-use WIFI carriers. If a wider bandwidth is allowed, the user data transmissions can also be performed.

In principle, there is only one core carrier at a time. The core carrier can be selected from the existing data carriers. In this case, the selected data carrier can be promoted as the new core carrier. The old core carrier may be either downgraded to serve as a data carrier or be released. The configuration of the new core carrier (e.g., its frequency) would be indicated in SIB message of the old core carrier. The eNB may also page the UEs on the core carrier. Alternatively, an eNB may choose to operate two or more groups of UEs each having their own, independent core carrier and data carriers.

A data carrier is primarily used for data transmissions to a UE or a group of UEs. The data carrier may be used to carry PDCCH and PDSCH for the data transmission, paging messages and/or SIB updating indicators, CRS, ePDCCH based on UE-specific DM RS, etc. The data carrier may have an operating bandwidth using the fragmented frequency resources in the unlicensed band. The data carrier may be non-adjacent; however, adjacent carriers are not precluded.

The eNB mainly schedules data intended for the UE in the data carrier assigned to that UE. The maximum transmission output power in the configured bandwidth may be limited. As a non-limiting example, maximum transmission output power is set to be 10 dBm (i.e. 10 mW). The LTE system may configure the system bandwidth on the data carrier as indicated in the new SIB message based on the availability of the WiFi channels. To determine the availability of a 5 MHz-wide WiFi channel, the eNB may use a history of UE WiFi measurement reports to compute average interference within the configurable RF switching schedule.

Figure 4:
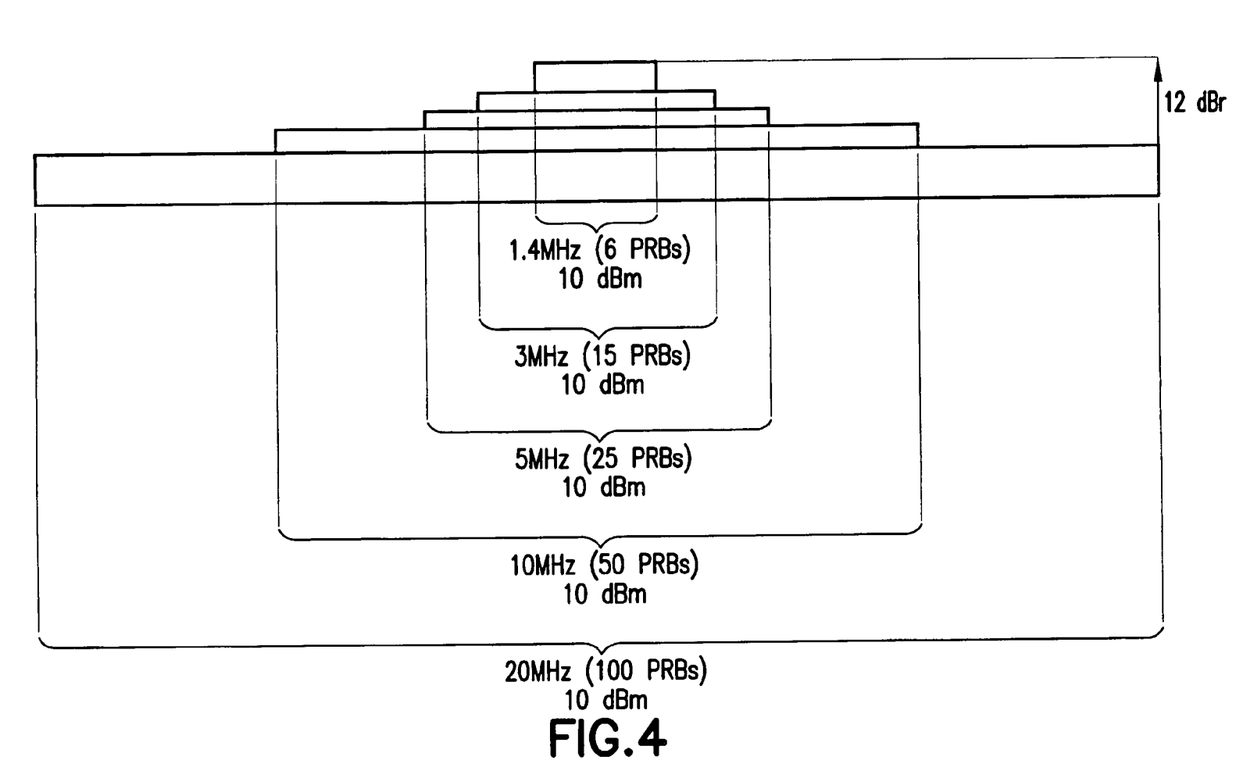
FIG. 4 demonstrates various carrier bandwidth/power configurations in accordance with an exemplary embodiment of this invention.

FIG. 4 demonstrates various carrier bandwidth/power configurations in accordance with this invention. As shown, a low-power LTE system is limited to 10 dBm maximum transmission output power. The available bandwidth for a channel may, in non-limiting examples, be 1.4 MHz, 3 MHz, 5 MHz, 10 Mz, or 20 MHz. Larger bandwidth transmissions are limited to low power, where smaller bandwidth transmissions may use more power. Accordingly, if a data carrier is experiencing too much noise, the eNB may adjust the bandwidth (and thus the maximum power allowed for transmission) in order to increase the signal to noise ratio (SINR).

In case a data carrier cannot be configured due to excessive WiFi interference, the eNB may use spare resources on the core carrier to schedule data to the UE.

Figure 5:
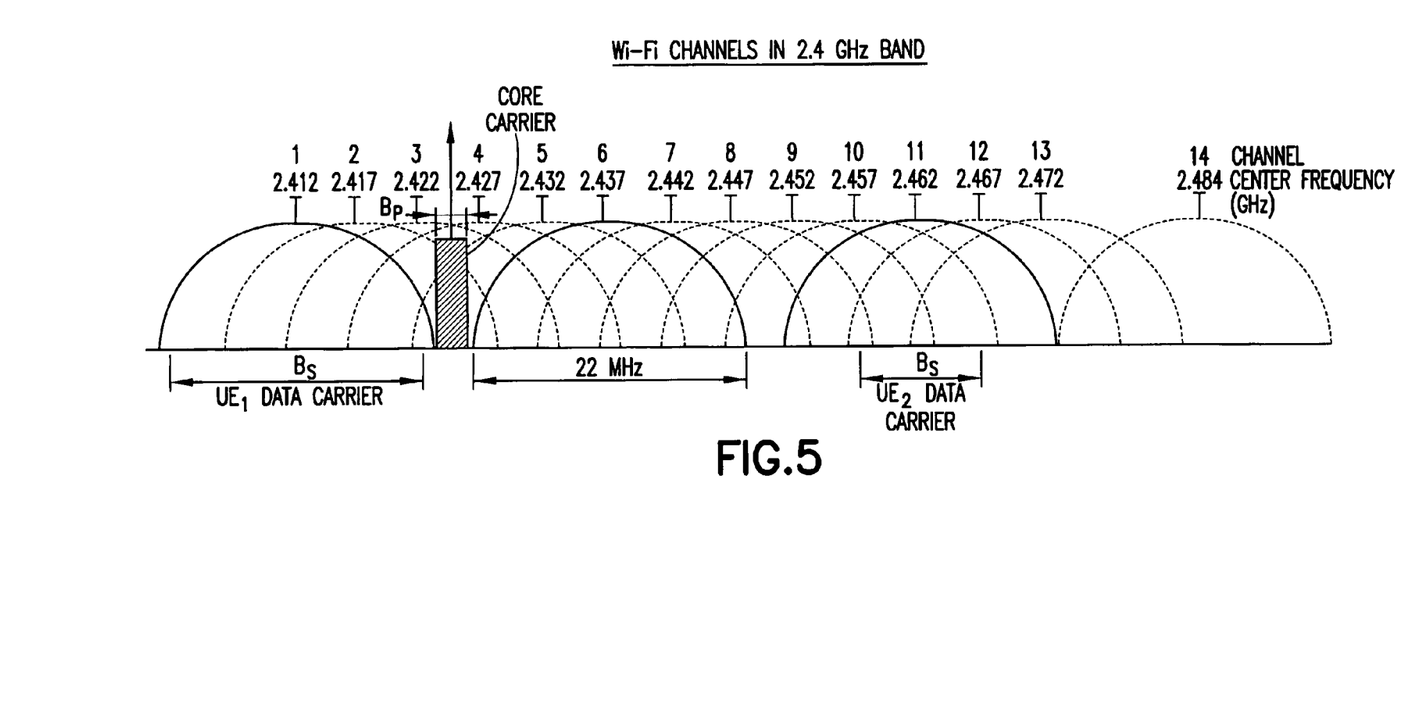
FIG. 5 shows a non-limiting example of a mapping of core carrier and data carriers in accordance with an exemplary embodiment of this invention.

A non-limiting example of mapping of core carrier and data carrier (for example, in ISM 2.4 GHz band using DS PHY in IEEE 802.11b standards) is shown in FIG. 5. $B_p$ is the primary bandwidth for the core carrier for $UE_1$ and $UE_2$. $B_s$ is secondary bandwidth for the data carriers serving $UE_1$ and $UE_2$. Since the core carrier is mapped to a gap in the frequency domain between two non-overlapping WiFi DS PHY signals, the interference from WiFi in the core carrier should be minimized. The data carriers may be mapped within a non-overlapping WiFi DS PHY signal. Hence, $UE_1$ and $UE_2$ may experience relatively more WiFi interference at their respective receivers.

$UE_2$ uses a data carrier in the 1st non-overlapping channel centered in WiFi channels 1. Based on a WiFi measurement report from $UE_1$, the eNB may decide that no significant WiFi interference is experienced at $UE_1$ (this may be due to $UE_1$ being relatively far from the WiFi interference source such as a WiFi Access Point or a WiFi station) and configures the bandwidth for the data carrier serving $UE_1$ to be relatively large (e.g., $B_s$=20 MHz).

On the other hand, $UE_2$ uses a data carrier in the 3rd non-overlapping channel centered in WiFi channels 11. $UE_2$ may experience significant interference and the eNB configures the bandwidth for the data carrier serving $UE_2$ (e.g., $B_s$=10 MHz). This allows a 3 dB gain for $UE_2$ (and any other UEs configured to use the data carrier) compared to $UE_1$ (and any other UEs configured the 20 MHz data carrier) since the max output power of 10 dBm may be used over 10 MHz instead of 20 MHz. Larger gains on the data carrier could be possible with smaller system bandwidth being configured, e.g., with 1.4 MHz (6 PRBs) system bandwidth, the maximum gain compare to system bandwidth 20 MHz (100 PRBs) can be about 10*log(100/6)=12 dB.

Figure 6:
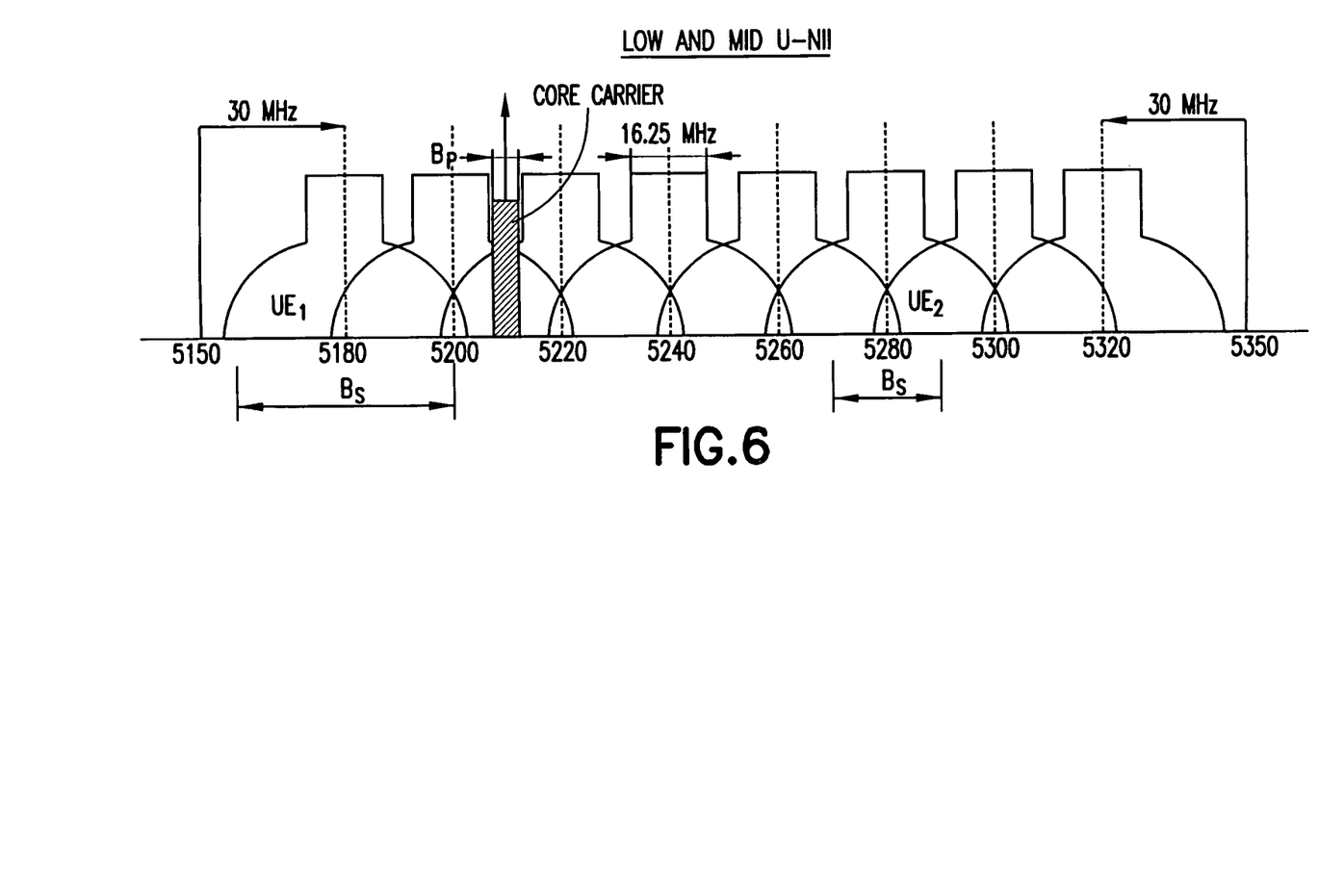
FIG. 6 shows another non-limiting example of a mapping of core carrier and data carriers in accordance with an exemplary embodiment of this invention.

FIG. 6 shows another non-limiting example of a mapping of core carrier and data carriers in accordance with an exemplary embodiment of this invention. As shown, the mapping is of core carrier and data carriers in a system that used 5 GHz bands (for example, in ISM 5 GHz band using DS OFDM in IEEE 802.11b standards).

Various exemplary embodiments in accordance with this invention provide a good balance between the performance and implementation cost for the devices with 1Rx chain. A control channel overhead in the data channel is quite small. Additionally, the exemplary embodiments may more fully utilize the factional resources in an unlicensed band. The distributed CA system is a virtual wideband system affording access for more (low-cost) UEs such as MTC devices. This is due in part to loose requirements on the operating bandwidth. Furthermore, no CCA or CSMA/CA based protocols are needed for low-power LTE system on unlicensed band.

Based on the foregoing it should be apparent that the exemplary embodiments of this invention provide a method, apparatus and computer program(s) to providing distributed carrier aggregation on unlicensed bands.

Figure 7:
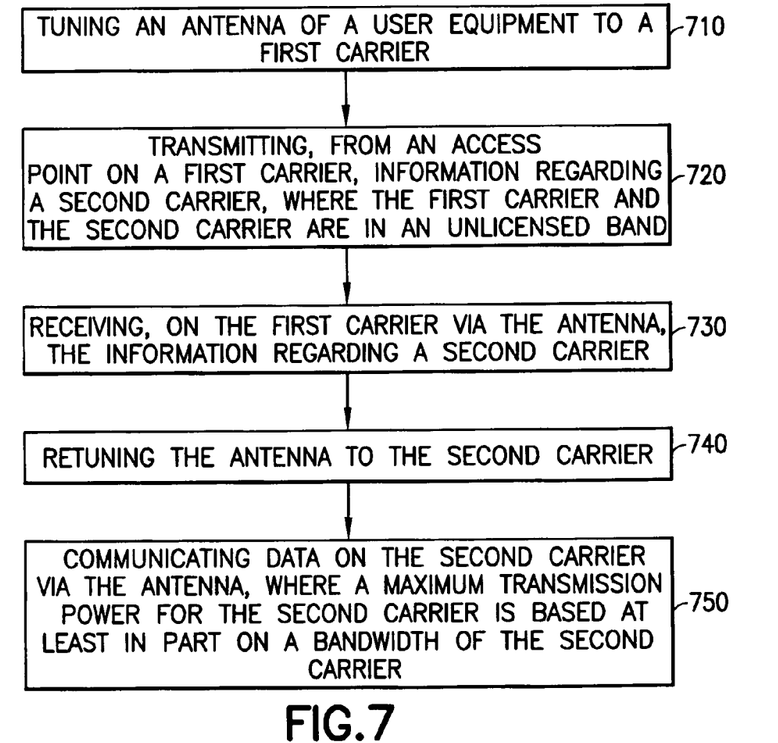
FIG. 7 is a logic flow diagram that illustrates the operation of an exemplary method, and a result of execution of computer program instructions embodied on a computer readable memory, in accordance with various exemplary embodiments of this invention.

FIG. 7 is a logic flow diagram that illustrates the operation of a method, and a result of execution of computer program instructions, in accordance with the exemplary embodiments of this invention. In accordance with these exemplary embodiments a method performs, at Block 710, a step of tuning an antenna of a user equipment to a first carrier. The method performs step of transmitting, from an access point on a first carrier, information regarding a second carrier at Block 720. The first carrier and the second carrier are in an unlicensed band. The method performs, at Block 730, a step of receiving, on the first carrier via the antenna, the information regarding a second carrier. Retuning the antenna to the second carrier is performed at Block 740. The method performs, at Block 750, a step of communicating data on the second carrier via the antenna. A maximum transmission power for the second carrier is based at least in part on a bandwidth of the second carrier The various blocks shown in FIG. 7 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems such as for example (WLAN, UTRAN, GSM as appropriate).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names assigned to different channels (e.g., PCFICH, PDCCH, PHICH, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method for distributed carrier aggregation comprising:
    tuning an antenna of a user equipment to a first carrier in a first frequency band;
    receiving, on the first carrier via the antenna, radio resource control information regarding a second carrier in a second frequency band, where the second carrier is in an unlicensed band;
    using radio resource control information received on the first carrier to retune the antenna to the second carrier; and thereafter
    communicating data on the second carrier via the antenna, where the radio resource control information comprises a switching schedule indicating when to tune the antenna to the first carrier and when to tune the antenna to the second carrier.

2. The method of claim 1, where the radio resource control information comprises configuration data for the second carrier.

3. The method of claim 2, where the configuration data comprises an indication of a bandwidth of the second carrier and a maximum transmission power for the second carrier is based at least in part on the bandwidth of the second carrier.

4. The method of claim 1, where the switching schedule comprises one of: a switching periodicity and a switching bitmap.

5. The method of any claim 1, where the first carrier serves as a core carrier and the method further comprises: receiving, on the first carrier via the antenna, instructions to use a third carrier as a new core carrier; retuning the antenna to the third carrier; and receiving, on the third carrier via the antenna, information regarding the second carrier, where the third carrier is in an unlicensed band.

6. The method of claim 1, where the maximum transmission power is 10 dBm.

7. The method of claim 1, where the method is performed by a processor executing a computer program that is tangibly encoded on a computer readable medium.

8. The method according to claim 1, wherein the first frequency band is in a licensed band.

9. The method according to claim 1, wherein the first frequency band is in an unlicensed band between two in-use WiFi carriers.

10. A method for distributed carrier aggregation comprising:
    transmitting, from an access point on a first carrier in a first frequency band, radio resource control information regarding a second carrier in a second frequency band, where the second carrier is in an unlicensed band; and thereafter
    communicating data with a user equipment on the second carrier,
    where the radio resource control information comprises a switching schedule instructing the user equipment when to tune the antenna to the first carrier and when to tune to the second carrier.

11. The method of claim 10, where the radio resource control information comprises configuration data for the second carrier.

12. The method of claim 11, where the configuration data comprises an indication of a bandwidth of the second carrier and the maximum transmission power for the second carrier is based at least in part on the bandwidth of the second carrier.

13. The method of claim 10, further comprising:
    receiving measurement information regarding the second carrier;
    determining the bandwidth of the second carrier based at least in part on the measurement information; and
    configuring the second carrier to use the bandwidth.

14. The method of claim 10, where the switching schedule comprises one of: a switching periodicity and a switching bitmap.

15. The method of claim 10, where the first carrier serves as a core carrier and the method further comprises:
    transmitting, from the access point on the first carrier, instructions for the user equipment to use a third carrier as a new core carrier; and
    transmitting, from the access point on the third carrier, information regarding the second carrier, where the third carrier is in an unlicensed band.

16. The method of claim 10, where the maximum transmission power is 10 dBm.

17. An apparatus for distributed carrier aggregation comprising at least one processor and at least one memory including computer program code, the at least one memory and the computer program code configured to, with the at least one processor, cause the apparatus at least to perform at least the following:
    to tune an antenna of a user equipment to a first carrier in a first frequency band;
    to receive, on the first carrier via the antenna, radio resource control information regarding a second carrier in a second frequency band, where the second carrier is in an unlicensed band;
    to use the radio resource control information received on the first carrier to retune the antenna to the second carrier; and thereafter
    to communicate data on the first carrier via the antenna,
    where the information comprises switching data instructing the user equipment when to tune the antenna to the first carrier and when to tune to the second carrier.

18. The apparatus of claim 17, where the first carrier serves as a core carrier and the at least one memory and the computer program code are further configured to cause the apparatus at least to perform:
    to receive, on the first carrier via the antenna, instructions to use a third carrier as a new core carrier;

to retune the antenna to the third carrier;

and to receive, on the third carrier via the antenna, information regarding the second carrier, where the third carrier is in an unlicensed band.

19. The apparatus of claim 17, where the switching data comprises one of: a switching periodicity and a switching bitmap.

20. The apparatus according to claim 17, where the configuration data comprises an indication of a bandwidth of the second carrier and the maximum transmission power for the second carrier is based at least in part on the bandwidth of the second carrier.

* * * * *

UNITED STATES PATENT AND TRADEMARK OFFICE
CERTIFICATE OF CORRECTION

| | |
|---|---|
| PATENT NO. | : 8,837,422 B2 |
| APPLICATION NO. | : 13/365432 |
| DATED | : September 16, 2014 |
| INVENTOR(S) | : Chen et al. |

It is certified that error appears in the above-identified patent and that said Letters Patent is hereby corrected as shown below:

In the Claims

Claim 5, column 11, line 54: Replace "The method of any claim 1" with --The method of claim 1--.

Claim 17, column 12, line 47: Replace "cause the apparatus at least to perform at least the" with --cause the apparatus to perform at least the--.

Signed and Sealed this
Twenty-fourth Day of March, 2015

Michelle K. Lee
*Director of the United States Patent and Trademark Office*